United States Patent [19]

Morikawa et al.

[11] Patent Number: 4,494,493
[45] Date of Patent: Jan. 22, 1985

[54] INTAKE SYSTEM FOR AN AUTOMOTIVE ENGINE

[75] Inventors: Kouji Morikawa, Narita Higashi; Hitoshi Suzuki, Niiza, both of Japan

[73] Assignee: Fuji Jukogyo Kabushiki Kaisha, Tokyo, Japan

[21] Appl. No.: 609,168

[22] Filed: May 11, 1984

[30] Foreign Application Priority Data

May 12, 1983 [JP] Japan .................. 58-83182

[51] Int. Cl.³ ............... F02B 29/02; F02B 31/00
[52] U.S. Cl. ................. 123/52 M; 123/308; 123/52 MB; 123/432
[58] Field of Search ............ 123/308, 432, 52 M, 123/52 MB

[56] References Cited

U.S. PATENT DOCUMENTS

| 4,181,105 | 1/1980 | Takemoto | 123/308 |
| 4,240,387 | 12/1980 | Motosugi et al. | 123/432 |
| 4,270,500 | 6/1981 | Nakagawa et al. | 123/308 |
| 4,347,816 | 9/1982 | Saito et al. | 123/432 |

FOREIGN PATENT DOCUMENTS

| 54821 | 5/1977 | Japan | 123/342 |
| 5650132 | 8/1978 | Japan | |

Primary Examiner—E. Rollins Cross
Attorney, Agent, or Firm—Martin A. Farber

[57] ABSTRACT

An intake system for an automotive engine having cylinders, primary intake ports communicated with the cylinders, secondary intake ports communicated with the cylinders. Each of the primary and secondary intake ports is communicated with a corresponding cylinder at a common intake valve. A primary intake manifold communicated with the primary intake ports and a secondary intake manifold communicated with the secondary intake ports are provided.

A first valve is provided in each branch of the secondary intake manifold for preventing a counter flow of inducted mixture. A bypass is provided at a position downstream of the first valve for communicating the primary intake manifold with the adjacent secondary intake manifold, and a second valve is provided to be operated to open the bypass when load on the engine exceeds a predetermined partial load.

5 Claims, 5 Drawing Figures

INTAKE SYSTEM FOR AN AUTOMOTIVE ENGINE

BACKGROUND OF THE INVENTION

The present invention relates to an intake system for an internal combustion engine having primary and secondary intake systems each having a carburetor, in which the primary intake system operates for light load and the secondary intake system operates for heavy load.

In order to improve combustion efficiency, a turbulence-generating port for providing a swirl effect is known. The turbulence-generating port is curved so as to admit air-fuel mixture in a tangential direction. However, such a curved port increases the resistance in the port.

As a method for improving the output at heavy load in addition to the swirl effect, Japanese Utility Model Publication 56-50132 discloses an intake system for an automotive engine comprising a first intake system for light and partial loads and a second intake system for heavy load. Each intake system has an intake passage having a carburetor and an intake port separated from the intake port for the other intake passage. At light and partial load, mixture is admitted into a corresponding cylinder through the first intake system, and at heavy load, mixture is admitted through both systems. The intake port of the first intake passage is reduced in cross sectional area for increasing the velocity of the mixture and disposed in a tangential direction to provide a swirl effect. The swirl effect is promoted by the mixture having increased velocity. However, the reduced intake port causes the operating range of the first intake system to reduce, which results in deterioration of the driveability of the vehicle at partial load.

SUMMARY OF THE INVENTION

The object of the present invention is to provide a dual-intake system of an automotive engine in which each intake port of a primary intake passage has a small sectional area thereby improving the swirl effect at light load without deteriorating the driveability at partial and heavy loads.

According to the present invention, there is provided an intake system for an automotive engine having cylinders, primary intake ports communicated with the cylinders, secondary intake ports communicated with the cylinders. Each of the primary and secondary intake ports is communicated with a corresponding cylinder at a common intake valve, and each primary intake port is disposed in a tangential direction so as to provide a swirl of inducted mixture, and sectional area of each primary intake port is reduced.

A primary intake manifold communicated with the primary intake ports and secondary intake manifold communicated with the secondary intake ports are provided.

A primary carburetor having a throttle valve is provided in the primary intake manifold, and a secondary carburetor having a throttle valve is provided in the secondary intake manifold. The throttle valve of the secondary carburetor is so arranged to be opened after the throttle valve of the primary carburetor has been fully opened.

A first valve is provided in each branch of the secondary intake manifold for preventing a counter flow of inducted mixture and the first valve is operatively connected to the throttle valve of the secondary carburetor so as to be opened together with the throttle valve. A bypass is provided at a position downstream of the first valve for communicating the primary intake manifold with the adjacent secondary intake manifold, and a second valve is provided to be operated to open the bypass when load on the engine exceeds a predetermined partial load.

The other objects and features of this invention will be apparently understood from the following description with reference to the accompanying drawings.

DETAILED DESCRIPTION OF THE PREFERRED EMBODIMENT

Figure 1:
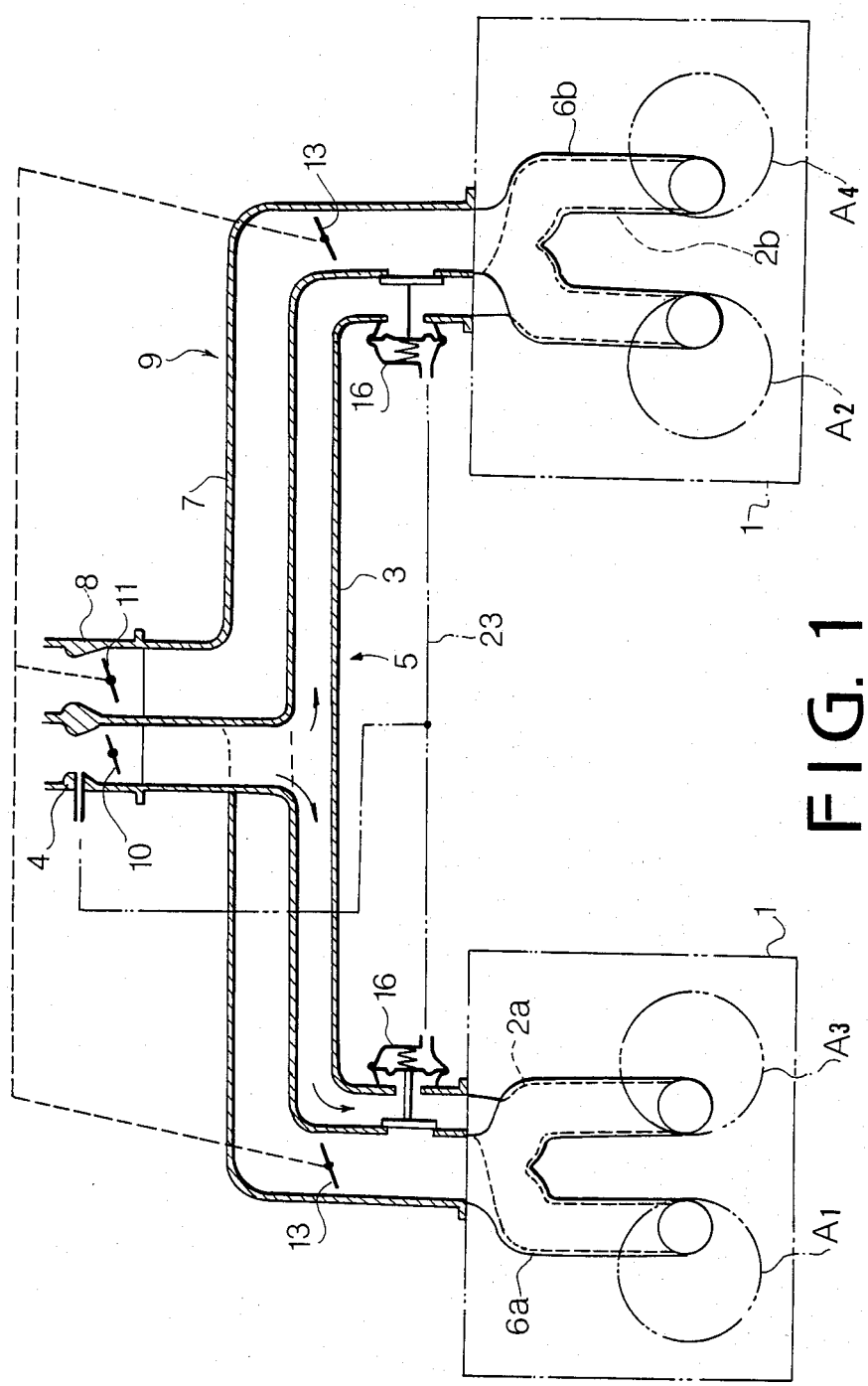
FIG. 1 is a schematic sectional view showing an embodiment of the present invention.
Figure 2:
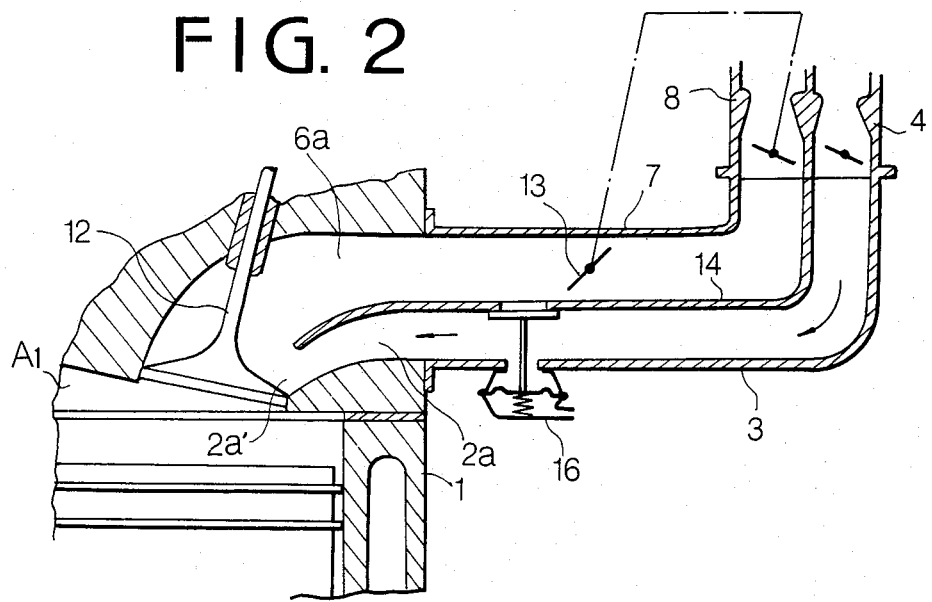
FIG. 2 is a sectional view showing one of intake passages.

Referring to FIGS. 1 and 2, an engine 1 is an opposed four-cylinder engine comprising Nos. 1 and 3 cylinders $A_1$ and $A_3$ and Nos. 2 and 4 cylinders $A_2$ and $A_4$. A bifurcated primary intake port 2a is communicated with the cylinders $A_1$ and $A_3$ and another primary intake port 2b is communicated with the cylinders $A_2$ and $A_4$. Secondary intake ports 6a and 6b are provided adjacent the primary intake ports 2a and 2b to communicate respective cylinders. Adjacent primary and secondary intake ports are communicated with each other at a position adjacent to a common intake valve 12. Sectional area of each primary intake port at the outlet 2a' is reduced and the primary intake port is disposed in a tangential direction to provide a swirl of inducted mixture.

Primary intake ports 2a and 2b are communicated with a primary intake manifold 3 having a primary carburetor 4 to form a primary intake system. Secondary intake ports 6a and 6b are connected to a secondary intake manifold 7 having a secondary carburetor 8 to form a secondary intake system. Throttle valves 10 and 11 of primary and secondary carburetors 4 and 8 are operatively connected with each other such that when an accelerator pedal is further depressed after the throttle valve 10 has been fully opened, the throttle valve 11 starts to open. That is, the throttle valve 10 is opened at light and partial load and the throttle valve 11 is opened at heavy load.

Since primary intake port 2a and secondary intake port 6a are communicated with each other at the outlet 2a', a port of mixture induced by the intake stroke of No. 1 cylinder $A_1$, for example, flows in the right hand branch of intake manifold 3 (FIG. 1), primary intake port 2b, intercommunicating portion of intake ports 2b and 6b, intake port 6b, intake manifold 7, and intake port 6a, and enters into the cylinder $A_1$. The addition of the mixture induced passing through the other branch of manifold causes the reduction of the swirl effect. In order to prevent such a counter flow of mixture, valves 13 are provide in right and left band branches of the intake manifold 7. A valve plate of each valve 13 is rotatably supported by a shaft which is operatively connected to a shaft of the throttle valve 11, so that the valve 13 may be opened together with the throttle valve 11.

Figure 3:
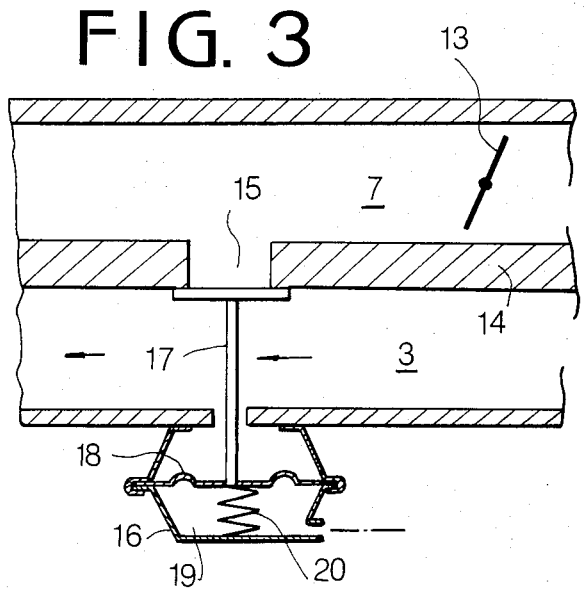
FIG. 3 is a sectional view showing a part of FIG. 2.

Adjacent intake manifolds 3 and 7 of each branch are communicated with each other by bypass 15 at the downstream side of valve 13. The bypass 15 is closed by a valve 17 which is operated by a diaphragm actuator 16. As shown in FIG. 3, the actuator comprises a diaphragm 18 connected to the valve 17, a vacuum chamber 19 defined by the diaphragm 18, and a spring 20 to urge the diaphragm to close bypass 15. The vacuum chamber 19 is communicated with the manifold so as to be supplied with the manifold vacuum of the manifold 3 or venturi vacuum. In the system of FIG. 1, the vacuum chamber 19 is communicated with the venturi of the carburetor 4 by a line 23. The actuator is so arranged as to move the valve 17 to open the bypass 15 in dependence on the vacuum at partial load.

Figure 4:
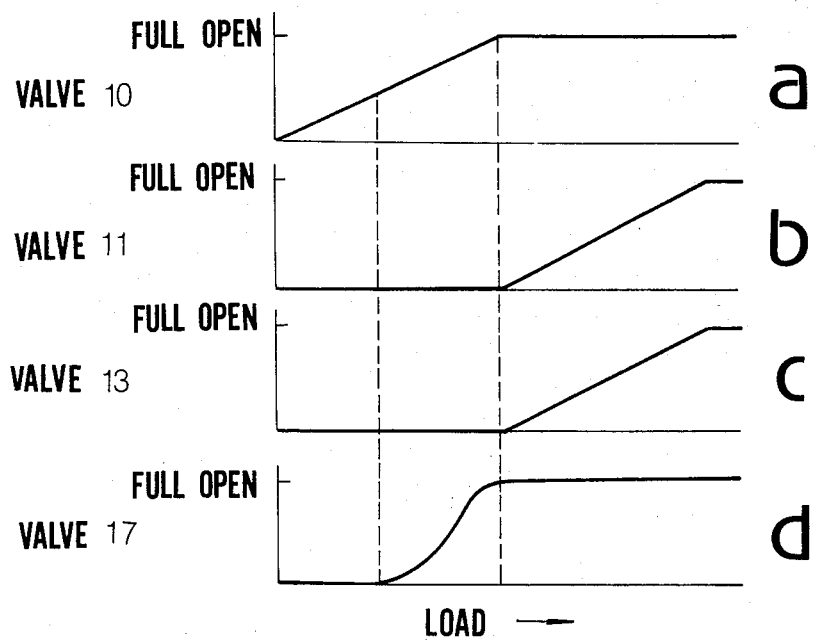
FIG. 4 is a graph showing opening degrees of valves.

In operation, the throttle valve 10 of the primary carburetor 4 opens at light load as shown in FIG. 4(a). Air-fuel mixture produced by the carburetor flows in the intake manifold 3 and intake ports 2a and 2b and enters into cylinders A₁ to A₄. Since the valve 17 closes bypass 15 at light load, the mixture is supplied only from intake ports 2a and 2b each having a small sectional area. Accordingly, sufficient swirl effect can be provided.

At partial load, as the amount of intake air increases, the vacuum at the venturi of the carburetor 4 increases, so that the valve 17 is gradually opened by the deflection of the diaphragm 18 as shown in FIG. 4(d). Accordingly, a part of the intake air-fuel mixture in the primary intake manifolds 3 enters into the secondary intake manifold 7 through the bypass 15 and into cylinders passing through the secondary intake ports 6a and 6b. Consequently, increased amount of mixture can be induced into cylinders through primary and secondary intake ports 2a, 2b, 6a and 6b without increasing the resistance in the intake ports 2a and 2b. During light and partial loads, valves 13 are closed as shown in FIG. 4(c), thereby preventing the counter flow of the intake mixture.

As shown in FIGS. 4(a) and 4(d), after the throttle valve 10 and valve 17 have been fully opened at heavy load, the throttle valve 11 begins to open as shown in FIG. 4(b) and valve 13 is also opened together with the opening of the valve 11 as shown in FIG. 4(c). Thus, air-fuel mixture produced in the secondary carburetor 8 is induced into cylinders through the secondary intake manifold 7 and intake ports 6a and 6b in addition to the mixture by the primary carburetor 4 with a small resistance in the manifold. Thus, the engine operates to produce a sufficient power for the heavy load.

Figure 5:
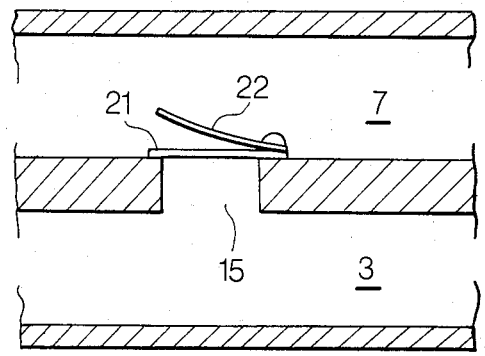
FIG. 5 is a sectional view showing another example of a bypass valve.

FIG. 5 shows another example of a valve for the bypass 15. The valve comprises a reed valve 21 and a stopper 22 for restricting the opening degree of the reed valve 21 to a predetermined degree. The reed valve is so disposed to open to the manifold 7. Since the sectional area of the primary intake port 2a at the outlet 2a' is reduced, pressure in the primary intake manifold 3 is higher than the secondary intake manifold 7 at partial load. Accordingly, the reed valve 21 is opened by the pressure difference, so that a part of mixture enters into the cylinder through the secondary manifold 7.

While the presently referred embodiment of the present invention has been shown and described, it is to be understood that this disclosure is for the purpose of illustration and that various changes and modifications may be made without departing from the spirit and scope of the invention as set forth in the appended claim.

What is claimed is:

1. An intake system for an automotive engine having cylinders comprising:
   primary intake ports communicated with said cylinders;
   secondary intake ports communicated with said cylinders;
   each of said primary and secondary intake ports being communicated with a corresponding cylinder at a common intake valve;
   each primary intake port being disposed in a tangential direction so as to provide a swirl of inducted mixture, and sectional area of each primary intake port being reduced;
   a primary intake manifold communicated with said primary intake ports;
   a secondary intake manifold communicated with said secondary intake ports;
   a primary carburetor having a throttle valve provided in said primary intake manifold;
   a secondary carburetor having a throttle valve provided in said secondary intake manifold;
   said throttle valve of the secondary carburetor being so arranged to be opened after the throttle valve of the primary carburetor has been fully opened;
   a first valve provided in each branch of said secondary intake manifold for preventing a counter flow of inducted mixture;
   said first valve being operatively connected to said throttle valve of the secondary carburetor so as to be opened together with the throttle valve;
   a bypass provided at a position downstream of said first valve for communicating the primary intake manifold with the adjacent secondary intake manifold; and
   a second valve provided to close said bypass and arranged to be operated to open said bypass when load on the engine exceeds a predetermined partial load.

2. The intake system for an automotive engine having cylinders according to claim 1, further comprising an actuator for actuating said second valve in dependency on the load on the engine.

3. The intake system for an automotive engine having cylinders according to claim 2 wherein said actuator is a diaphragm actuator operated by vacuum in the primary intake manifold.

4. The intake system for an automotive engine having cylinders according to claim 1 wherein said second valve is a reed valve which is arranged to be opened to said secondary intake manifold.

5. The intake system for an automotive engine having cylinders according to claim 4, further comprising a stopper for restricting the opening degree of said reed valve to a predetermined degree.

* * * * *